United States Patent
Graf et al.

(10) Patent No.: US 11,687,044 B2
(45) Date of Patent: Jun. 27, 2023

(54) REDUNDANTLY CONFIGURED AUTOMATION SYSTEM AND METHOD USING THREE SUBSYSTEMS

(71) Applicant: Siemens Aktiengesellschaft, Munich (DE)

(72) Inventors: Rene Graf, Zirndorf (DE); Guido Steinhauer, Büchelberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 126 days.

(21) Appl. No.: 17/184,812

(22) Filed: Feb. 25, 2021

(65) Prior Publication Data

US 2021/0263481 A1    Aug. 26, 2021

(30) Foreign Application Priority Data

Feb. 26, 2020   (EP) ..................................... 20159522

(51) Int. Cl.
*G05B 9/03*    (2006.01)
(52) U.S. Cl.
CPC ...................... *G05B 9/03* (2013.01)
(58) Field of Classification Search
None
See application file for complete search history.

(56) References Cited

U.S. PATENT DOCUMENTS

| 2007/0168058 A1* | 7/2007 | Kephart | G06F 11/2028 |
| | | | 714/E11.08 |
| 2018/0260125 A1* | 9/2018 | Botes | G06F 11/1662 |
| 2018/0349235 A1* | 12/2018 | Freydel | G06F 11/182 |
| 2019/0296654 A1* | 9/2019 | Azidehak | H02M 5/4585 |
| 2021/0089015 A1* | 3/2021 | Law | G05B 19/042 |

FOREIGN PATENT DOCUMENTS

| CN | 105929765 | 9/2016 |
| EP | 0907912 | 4/1999 |
| EP | 2657797 | 10/2013 |
| GB | 2477237 | 7/2011 |

OTHER PUBLICATIONS

EP Search Report dated Aug. 7, 2020 based on EP20159522 filed Feb. 26, 2020.

* cited by examiner

*Primary Examiner* — Bernard G Lindsay
(74) *Attorney, Agent, or Firm* — Cozen O'Connor

(57) ABSTRACT

Method for operating a redundantly configured automation system which includes has a first subsystem, a second subsystem and a third subsystem, wherein a sequence program is implemented in each of the subsystems of the automation system and is executable in a runtime environment to fulfill automation tasks, and wherein a data memory is implemented in the subsystems in each of the automation systems, where the sequence program includes at least a first subprogram and a second subprogram, the data memory in each of the subsystems includes at least a first submemory and a second submemory, the first subprogram and the first submemory are synchronized with a first synchronization clock between the first and second subsystems, and the second subprogram and the second submemory are synchronized with a second synchronization clock between the first and third subsystems, and where the first and synchronization clocks differ from one another.

18 Claims, 3 Drawing Sheets

REDUNDANTLY CONFIGURED AUTOMATION SYSTEM AND METHOD USING THREE SUBSYSTEMS

BACKGROUND OF THE INVENTION

1. Field of the Invention

The invention relates to a redundantly configured automation system with a first, a second and a third subsystem and to a method for operating the redundantly configured automation system.

2. Description of the Related Art

In the field of automation, highly available solutions (H-systems), which are suited for reducing possibly occurring idle times of a technical installation to a minimum, are increasingly required. Above all, in specific, critical areas, such as power plants or chemical installations, the control technology used there is generally designed to be redundant, in order to be able to ensure the safe operation of the installation in the event of system failure. Accordingly, in such cases, peripheral components and networks are also designed to be fully or at least partially redundant.

Redundant controllers consist of two identical individual controllers. Identical here means that these controllers have the same performance and generally also the same version of the software running thereupon, both concerning the internal software (firmware) and also with respect to the user program that controls the installation. Reference is also made here to a system redundancy, because, aside from the identical program, the data is also synchronized cyclically and completely between the two subsystems.

The development of highly available solutions of this type is very cost-intensive, where an H-system typically employed in the field of automation is characterized in that two or more subsystems in the form of automation devices or computer systems are coupled to one another via a synchronization link. In principle, both subsystems can have read and/or write access to the peripheral units connected to this H-system. One of the two subsystems is leading with respect to the periphery connected to the system. This means that outputs to peripheral units or output information for these peripheral units are only performed by one of the two subsystems that operates as a master or has taken over the master function. To ensure that both subsystems can run synchronously, these are synchronized at regular intervals via a synchronization link. Different designs can be differentiated (warm standby, hot standby) with respect to the frequency of the synchronization and its extent.

Siemens catalog ST 70, Chapter 6, Issue 2011 discloses a redundant automation system that consists of two subsystems and is provided to increase the availability of an installation to be controlled. This automation system is regularly synchronized such that failure of one of these subsystems does not have a damaging effect on a process to be controlled is ensured, because the other subsystem can continue the execution or the processing of the corresponding part of its respective control program or the execution or processing of the corresponding parts of this control program.

EP 0 907 912 B1 discloses a synchronization method for an automation system assembled from two subsystems. This synchronization method is based on a temporally synchronous coupling of the two subsystems, where at suitable program points, at which an alignment is provided, both systems await a response from the respective other subscriber and only then continue their program processing synchronously in terms of time.

EP 2 657 797 A1 discloses a method for operating a redundant automation system which contains a synchronization method.

In conventional systems, the assignment of both subsystems as a redundancy partner is defined, so that if one of these two subsystems fails, the other subsystem must run on its own (singular) and therefore not in a highly available manner, until the faulty system has been replaced by an identical system. In this regard, identical not only indicates that the hardware must be identical, but also the firmware version.

Two problems emerge from the fixed assignment. In the first instance, in the event of a fault, the overall system only runs singularly for the time of the repair and can therefore offer no protection from further failures. This time can be relatively long, since initially a replacement device must be obtained from the warehouse (best case) or from the supplier (worst case) and installed. Moreover, it must be ensured that the hardware and firmware versions of the replacement device generally allow direct exchange.

In the second problematic case, in the event of a planned retrofit, the replacement part is available directly, but singular operation also results here, even though it is significantly shorter in terms of time. The rules of the required version identity likewise apply, here.

The first problem of temporary singular operation cannot be resolved with highly available controllers with a complete system redundancy, but it is accepted because with a single error it is ensured that the overall system does not fail completely. Only with what is known as a double error can operation no longer be guaranteed.

Various solutions are known with respect to the second problem. In a first solution, the replacement devices must have the same hardware version as all devices employed during ongoing operation and can therefore be brought to the identical firmware version as the devices used, even before storage, so that they can be exchanged practically blind.

In a second scenario, the devices are tolerant with respect to minor changes in the firmware version and can enter redundant operation with the newer replacement devices because the manufacturer guarantees full compatibility for these small deviations. A device with the exemplary version "3.2.4" can enter redundant operation with devices whose firmware version only differs in the last point, in other words for instance version "3.2.7".

In another scenario, should the firmware version differ in one of the higher points, no redundant operation is possible, however, but replacement of the running device with the replacement device can be performed without interrupting the control of the technical process. To this end, the two devices run through the usual sequence, with which the last started system couples to the already running one and iteratively takes over both the program running there and also the current data. With program and data equality on both subsystems, a change is not made into redundant operation, but instead the device with the newer firmware takes over exclusive control of the process, while the previously running device switches off. This can then be upgraded to the identical firmware version of the replacement device and go back into the fully redundant operation herewith. With this method, the duration of the singular operation is lengthened, but in return the controller must not be switched off overall; this would not be so easy with some technical processes (e.g., chemical installations) because the process would then continue to run uncontrolled.

SUMMARY OF THE INVENTION

In view of the foregoing, it is therefore an object of the invention to provide a redundantly configured automation system that avoids the afore-cited disadvantages associated with conventional automation systems.

This and other objects and advantages are achieved in accordance with the invention by a redundantly configured automation system having a first subsystem, a second subsystem and a third subsystem, where a sequence program, which can be executed in a runtime environment in order to fulfill automation tasks, is implemented in the subsystems of the automation system. Moreover, a data memory is implemented each of the subsystems of the automation system.

The sequence program has at least a first subprogram and a second subprogram, and the data memory in each of the subsystems has at least a first submemory and a second submemory.

With the inventive automation system, the first submemory is assigned to the first subprogram and the second submemory is assigned to the second subprogram, and a synchronization clock of the first subprogram and the first submemory differs from a synchronization clock of the second subprogram and the second submemory.

The inventive automation system is configured to synchronize the first subprogram and the first submemory between the first subsystem and the second subsystem and to synchronize the second subprogram and the second submemory between the first subsystem and the third subsystem.

Automation systems are used to realize an automation and can be programmable logic controllers, for instance, a SIMATIC S7-400 by the company Siemens, which represents a high-level control function for low-level controllers, such as a SIMATIC ET 200 by the company Siemens.

In the application-granular, redundant automation system, a subprogram (also referred to as an app) and the associated submemory form a unit. The submemory can contain (automation) data required by the subprogram within the context of its embodiment, such as process data. In accordance with the invention, at least two units have a synchronization clock that differs from one another. While a first unit (first subprogram and first submemory) is synchronized with a synchronization clock of 10 ms between the two subsystems, for instance, the synchronization clock of the second subprogram and the second submemory can amount to 50 ms, for instance.

With an assumed data quantity per subprogram in the order of magnitude of a few 100 bytes or fewer kilobytes, and an assumed Gigabit Ethernet coupling between the two subsystems, 10 kB of data can be transmitted in approx. 20 microseconds. Even if the complete synchronization consists of a number of individual steps, with the inventive automation system synchronization clocks of less than 100 microseconds are possible.

The division of a large program, which can only be synchronized as a whole, into a number of small subprograms with defined associated (data) memories, brings about a series of advantages. The individual subprograms can be triggered with the respectively suitable update cycles, because these are each specified. Significantly more high frequency subprograms/apps through to field bus-synchronous regulators can be realized redundantly via the partial synchronization with correspondingly small data quantities.

The disengagement of the redundancy from the International Electrotechnical Commission (IEC) 61131 standard context previously present in conventional controllers also allows for the use of other programming languages for highly available subprograms.

Furthermore, the synchronization of the second subsystem with the first subsystem that is already running is significantly more high-performance when the inventive automation system is used, because each subprogram can be synchronized individually. With conventional automation systems, in contrast, all subprograms/data must be synchronized with a single, identical synchronization clock that, with a corresponding data quantity, can also fail because the data can change continuously. With the inventive automation system, the submemory (or data contained therein) of a subprogram is directly connected to the synchronization clock of the subprogram. Consequently, this error can initially not appear at all.

The core of the inventive automation device lies in the missing assignment of a subsystem to a fixed (single) redundancy partner, which must be the case with the previously known complete system redundancy. In combination with the subprogram granular redundancy, new possibilities result because each individual subprogram (including associated submemory) can find its redundant counter piece on another subsystem.

Combinations of synchronization partnerships that were previously not possible are possible via the inventive automation system. A subsystem can have an x86 architecture, for instance, while the partner subsystem has an ARM architecture. The fact that one of the two subsystems is possibly considerably faster than the other is irrelevant here. An architecture is therefore possible, for instance, in which a very powerful subsystem is the synchronization partner for a number of weaker subsystems.

The software or firmware version of the two synchronization partners can be different provided the sequence of the subprograms is ensured under both versions.

The individual subprograms need not run in a fixed cycle, but can instead also be triggered in an event-based manner, e.g., by changing a variable by another subprogram. The information is available for the execution environment of the subprograms (the runtime environment), with respect to which submemory or which data belong to the event-triggered subprogram. This data or these submemories can therefore be synchronized accordingly between the two subsystems before starting the associated subprogram. If a separate trigger variable is used here, then the consistency of all other variables can also be ensured, by this trigger variable always being written as the last by the other subprogram. In addition, the number of events can be significantly reduced, because a trigger does not have to be produced for each individual variable change but only for this one. This concept is based on the IEC-61499 mechanism.

The subsystems need not necessarily be arranged within a single technical installation. Instead, one or more technical systems can also be cloud-based. This means that the subsystem or subsystems are implemented in a computer network with online-based memory and server services, which are typically also referred to as a cloud or cloud platform. The data stored in the cloud is accessible online, so that other subsystems of the automation system have access to the cloud-based subsystem or subsystems via the Internet.

In one advantageous embodiment of the invention, a subprogram and a submemory assigned to the subprogram are each contained in a computer-implemented container. The runtime environment utilized assists the encapsulation of individual applications in containers. Therefore redundant subprograms can also be encapsulated because the data or the associated submemory of these subprograms are also stored and managed centrally when containers are used. The use of containers simplifies the unique assignment of subprogram and submemory or data because the container draws a defined limit around the two.

With a preferred embodiment of the invention, the first subsystem and the second subsystem are connected to one another via an explicit synchronization link, while the first subsystem and the third subsystem are connected to one another via an implicit synchronization link. Here, an explicit synchronization link is understood to mean a data link that is used exclusively for the data traffic of the synchronization mechanisms between the two subsystems. No larger network has to be covered here, but instead only a point-to-point connection. As a result, the data here is in most cases transmitted onto the lowermost and thus quickest possible plane of the network (layer 2 in the OSI layer model). Here, an implicit synchronization link is understood to mean a data link that is not used exclusively for the data traffic of the synchronization mechanisms between the two subsystems. The advantage here is that the system setup can be configured to be simpler. Through the use of various synchronization mechanisms, the advantage, which arises from the variable, subprogram-granular assignment of the individual subsystems, is further intensified because it is possible to select between different synchronization mechanisms, depending on the requirement of the individual subprograms. This selection need not be static, but can, instead, be selected dynamically, for instance, with (temporary) capacity restrictions of individual subsystems.

The first, second and third subsystems can, alternatively or in addition, be connected to one another via a multiple, explicit synchronization link. The multiple, explicit synchronization link here represents an extension of the concept of the explicit synchronization link. Explicit means that the synchronization link exists exclusively between the relevant subsystems (and not to further components of a technical installation). Multiple means that more than two subsystems are connected explicitly with one another. The multiple, explicit synchronization link preferably comprises a network switch, which assumes the coordination of the data transfer between the individual subsystems. The data transfer is based here on the Ethernet protocol. This development enables an efficient data exchange for the purpose of synchronizing the individual subprograms/submemories between the individual subsystems. Well-proven standard technology can be accessed here.

Within the scope of a preferred embodiment of the automation system, the sequence program additionally includes at least one third subprogram. Accordingly, the data memory additionally includes at least one third submemory. Here, the automation system is configured to synchronize the third subprogram and the third submemory between the second subsystem and the third subsystem. With the variable assignment of synchronization partners to a subprogram-granular plane, it is possible to assume very precisely the specific synchronization requirements of the individual subprograms/submemories.

The individual subsystems are preferably configured particularly especially to dynamically determine a respective synchronization partner for synchronization of a subprogram and an associated submemory based on a quality criterion. The connection to other subsystems can be established differently in particular with respect to the throughput and latency and can change. A subsystem can automatically determine via the quality criterion, which other subsystem is currently most suited to a specific synchronization task. In particular, after a subsystem fails, the remaining, still functioning subsystem can seek other synchronization partners quickly and efficiently, so that the time of the non-redundant operation can be reduced significantly.

It is also an object of the invention to provide a method for operating a redundantly designed automation system, which has a first subsystem, a second subsystem and a third subsystem, where a sequence program is implemented in the subsystems of the automation system respectively, which can be executed in a runtime environment in order to fulfill automation tasks. Here, a data memory is implemented in each subsystem of the automation system.

The sequence program has at least a first subprogram and a second subprogram, where the data memory has in each case at least a first submemory and a second submemory.

The first subprogram and the first submemory are synchronized with a first synchronization clock between the first subsystem and the second subsystem, and the second subprogram and the second submemory are synchronized with a second synchronization clock between the first subsystem and third subsystem, where the first synchronization clock and the second synchronization clock differ from one another.

Within the context of the method, similarly to the automation system, a subprogram and a submemory assigned to the subprogram are also preferably contained in a computer-implemented container.

Within the context of a preferred embodiment of the method, the first subsystem and the second subsystem are connected to one another via an explicit synchronization link, while the second subsystem and the third subsystem are connected to one another via an implicit synchronization link.

The first subsystem, the second subsystem and the third subsystem are connected to one another particularly preferably via a multiple, explicit synchronization link. The multiple, explicit synchronization link preferably comprises at least one network switch and is based on an Ethernet protocol.

In an advantageous embodiment of the inventive method, the sequence program additionally includes at least one third subprogram, and the data memory additionally includes at least one third submemory, where the automation system synchronizes the third subprogram and the third submemory between the second subsystem and the third subsystem. Here, the individual subsystems can be configured to dynamically determine a respective synchronization partner for synchronization of a subprogram and an associated submemory on the basis of a quality criterion.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which these are achieved will now become clearer and more intelligible in conjunction with the following description of the exemplary embodiment, which will be explained in detail making reference to the drawings, in which.

DETAILED DESCRIPTION OF THE EXEMPLARY EMBODIMENTS

Figure 1:
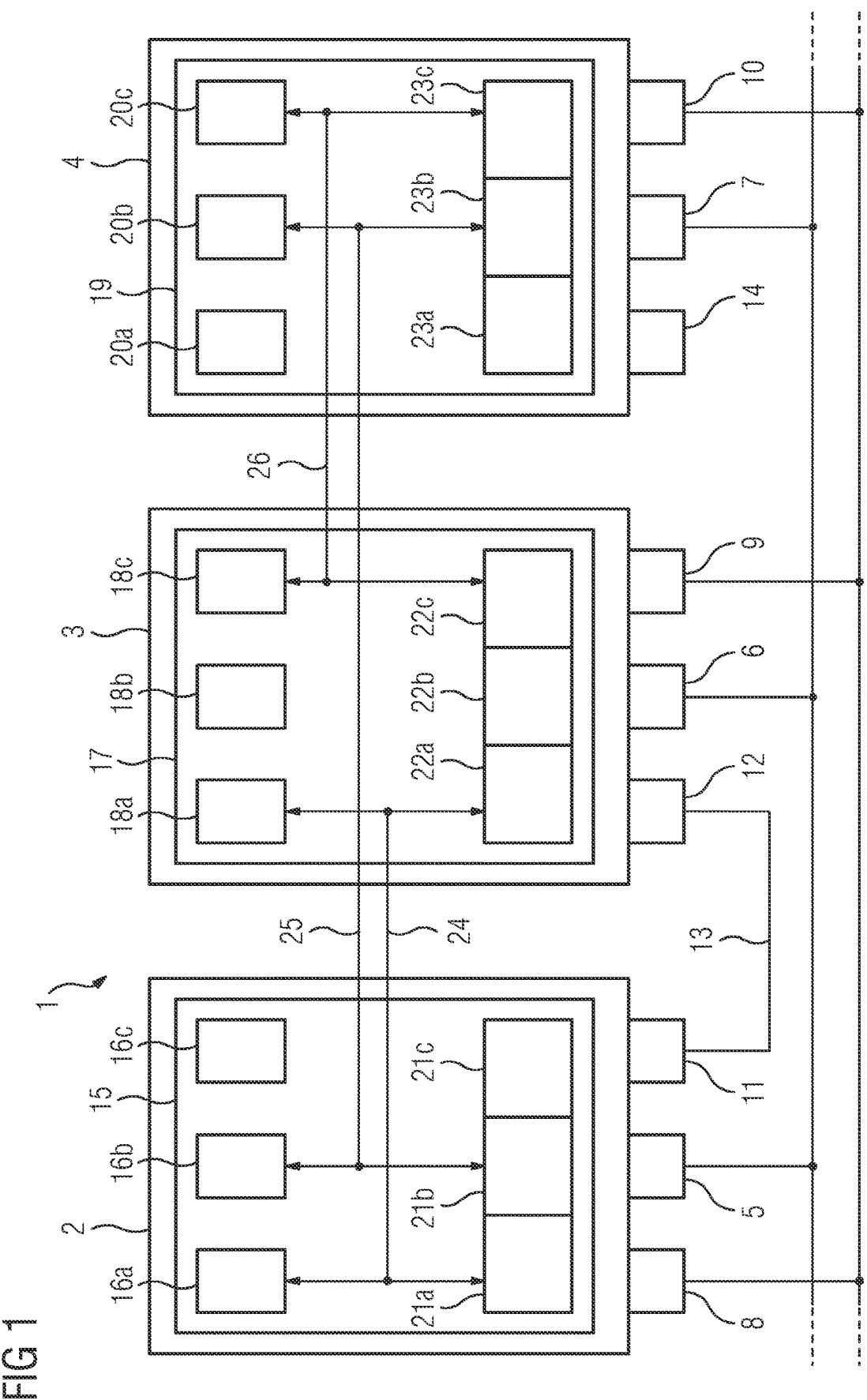
FIG. 1 shows a first redundant automation system.

FIG. 1 shows a redundantly configured automation system 1. The automation system 1 can be used in a process technology installation, for instance, and has a first subsystem 2, a second subsystem 3 and a third subsystem 4. The first subsystem 2 has a first network interface 5, the second subsystem 3 has a second network interface 6 and the third subsystem 4 has a third network interface 7, via which the first, second and third subsystems 2, 3, 4 can communicate with external devices (not shown). Here, the redundant automation system 1 can appear outwardly as just one single network subscriber or as three separate ones, independently of the respective implementation.

The first subsystem 2 moreover has a first bus interface 8, the second subsystem 3 has a second bus interface 9 and the third subsystem 4 has a third bus interface 10. The bus can be a Profinet field bus. Peripheral components, such as sensors or actuators, can be connected to the bus interfaces 8, 9, 10 in order to be able to transmit and receive corresponding data. The peripheral components are generally connected in parallel to the bus interfaces 8, 9, 10 (as shown), so that if one of the subsystems 2, 3, 4 fails, then the continuing subsystem 2, 3, 4 contains all the necessary data. Peripheral components can, in part, also only be connected to one or two of the three subsystems 2, 3, 4, because they are only relevant to this subsystem 2, 3, 4, for instance, such as the temperature sensor in a control cabinet of this subsystem 2, 3, 4.

Moreover, the first subsystem 2 has a first synchronization interface 11 and the second subsystem 3 has a second synchronization interface 12. The two synchronization interfaces 11, 12 are used exclusively for the data traffic within the context of an explicit synchronization of the two subsystems 2, 3 and are connected to one another via a corresponding link 13. This is therefore a straight point-to-point connection, upon which data is, in most cases, transmitted to the lowermost and thus quickest possible plane (i.e., in the layer 2 of the Open Systems Interconnection (OSI) layer model). The third subsystem 4 has a third synchronization interface 14. In the present exemplary embodiment, this is not linked to either of the two further synchronization interfaces 11, 12, however, to which the invention is however in no way restricted.

Three subprograms 16a, 16b, 16c are implemented in a runtime environment 15 of the first subsystem 2. The individual subprograms 16a, 16b, 16c can process different automation tasks here, for instance, a regulation or a monitoring of sensors and/or actuators connected to the first subsystem 2 via the bus interface 8. Similarly, three subprograms 18a, 18b, 18c are implemented in a runtime environment 17 of the second subsystem 3 and three subprograms 20a, 20b, 20c are implemented in a runtime environment 19 of the third subsystem 4.

A memory is also implemented in the first subsystem 2, which comprises three submemories 21a, 21b, 21c. Each of the submemories 21a, 21b, 21c is assigned to one of the subprograms 16a, 16b, 16c of the first subsystem 2. Data that originates from peripheral components or the assigned subprogram 16a, 16b, 16c connected to the first subsystem 2 via the bus interface 8 is located in the submemories 21a, 21b, 21c. Similarly, the second subsystem 3 has three submemories 22a, 22b, 22c, and the third subsystem 4 has three submemories 23a, 23b, 23c, which are configured similarly.

The assignments of the individual subprograms 16a, 16b, 16c, 18a, 18b, 18c, 20a, 20b, 20c to the respective submemories 21a, 21b, 21c, 22a, 22b, 22c, 23a, 23b, 23c are stored in the runtime environments 15, 17, 19. The following subprograms 16a, 16b, 16c, 18a, 18b, 18c, 20a, 20b, 20c are synchronized together with the associated submemories 21a, 21b, 21c, 22a, 22b, 22c, 23a, 23b, 23c between the subsystems 2, 3, 4 described below (for the sake of clarity only the subprograms are detailed below).

The first subprogram 16a of the first subsystem 2 is synchronized with the first subprogram 18a of the second subsystem 3 (i.e., the two subprograms 16a, 18a are identical). A first logical synchronization channel 24 is defined for this combination. The synchronization clock of the first synchronization channel 24 amounts, for instance, to 10 milliseconds.

The second subprogram 16b of the first subsystem 2 is synchronized with the second subprogram 20b of the third subsystem 4 (i.e. the two subprograms 16b, 20b are identical). For this combination, a second logical synchronization channel 25 is defined. The synchronization clock of the second synchronization channel 25 amounts to 50 milliseconds, for instance.

The third subprogram 18c of the second subsystem 3 is synchronized with the third subprogram 20c of the third subsystem 4 (i.e., the two subprograms 18c, 20c are identical). For this combination, a third logical synchronization channel 26 is defined. The synchronization clock of the third synchronization channel 26 amounts to 30 milliseconds, for instance.

The third subprogram 16a of the first subsystem 2, the second subprogram 18b of the second subsystem 3 and the first subprogram 20a of the third subsystem 4 are not synchronized, but are instead only processed by a runtime environment 15, 17, 19 as singular applications in each case. A synchronization can be recorded by the variable automation system 1 at any time, however.

While the first subsystem 2 and the second subsystem 3 are connected to one another via the explicit synchronization link 13, an implicit synchronization link exists between the first subsystem 2 and the third subsystem 4 and between the second subsystem 3 and the third subsystem 4 via the network interfaces 5, 6, 7. New possibilities result through a use of the described automation system 1, because each individual subprogram 16a, 16b, 16c, 18a, 18b, 18c, 20a, 20b, 20c can find its redundant counter piece on another subsystem 2, 3, 4 provided the quality of the synchronization link between the respective subsystems 2, 3, 4 is sufficiently high. To this end, the automation system 1 can determine at least one quality criteria of the synchronization links, and therefrom to dynamically determine a suitable synchronization partner for synchronizing a specific subprogram 16a, 16b, 16c, 18a, 18b, 18c, 20a, 20b, 20c.

The assignment of the synchronization partner can be freely selected and can occur not only at the start of a subprogram 16a, 16b, 16c, 18a, 18b, 18c, 20a, 20b, 20c, but instead in particular also in the event of failure of one of the two synchronization partners, so that the time of the singular operation can be reduced to the time of coupling the newly selected partner.

Similarly, a planned relocation of a redundant subprogram 16a, 16b, 16c, 18a, 18b, 18c, 20a, 20b, 20c to other subsystems 2, 3, 4 is therefore possible in order to be able to download and restart this, e.g., for a firmware update. To this end, the subsystem 2, 3, 4 that processes the continuing part of the subprogram 16a, 16b, 16c, 18a, 18b, 18c, 20a, 20b, 20c to be synchronized will seek a new synchronization partner for all subprograms 16a, 16b, 16c, 18a, 18b, 18c, 20a, 20b, 20c running thereupon by determining quality criteria. Two possible methods can then be disputed.

In the first method, the previous instance (i.e., the sequence of the subprogram 16a, 16b, 16c, 18a, 18b, 18c, 20a, 20b, 20c) on the subsystem 2, 3, 4 which is not continuing is stopped and the new (redundant) instance on the new synchronization partner is started. The time involved in the singular operation is therefore also no longer than the time involved in coupling.

In the second method, the instances are disposed in a clear master-slave role. As a result, the subprogram 16a, 16b, 16c, 18a, 18b, 18c, 20a, 20b, 20c is firstly explained on the continuing subsystem 2, 3, 4 to the master so that the slave is definitively stopped.

Figure 2:
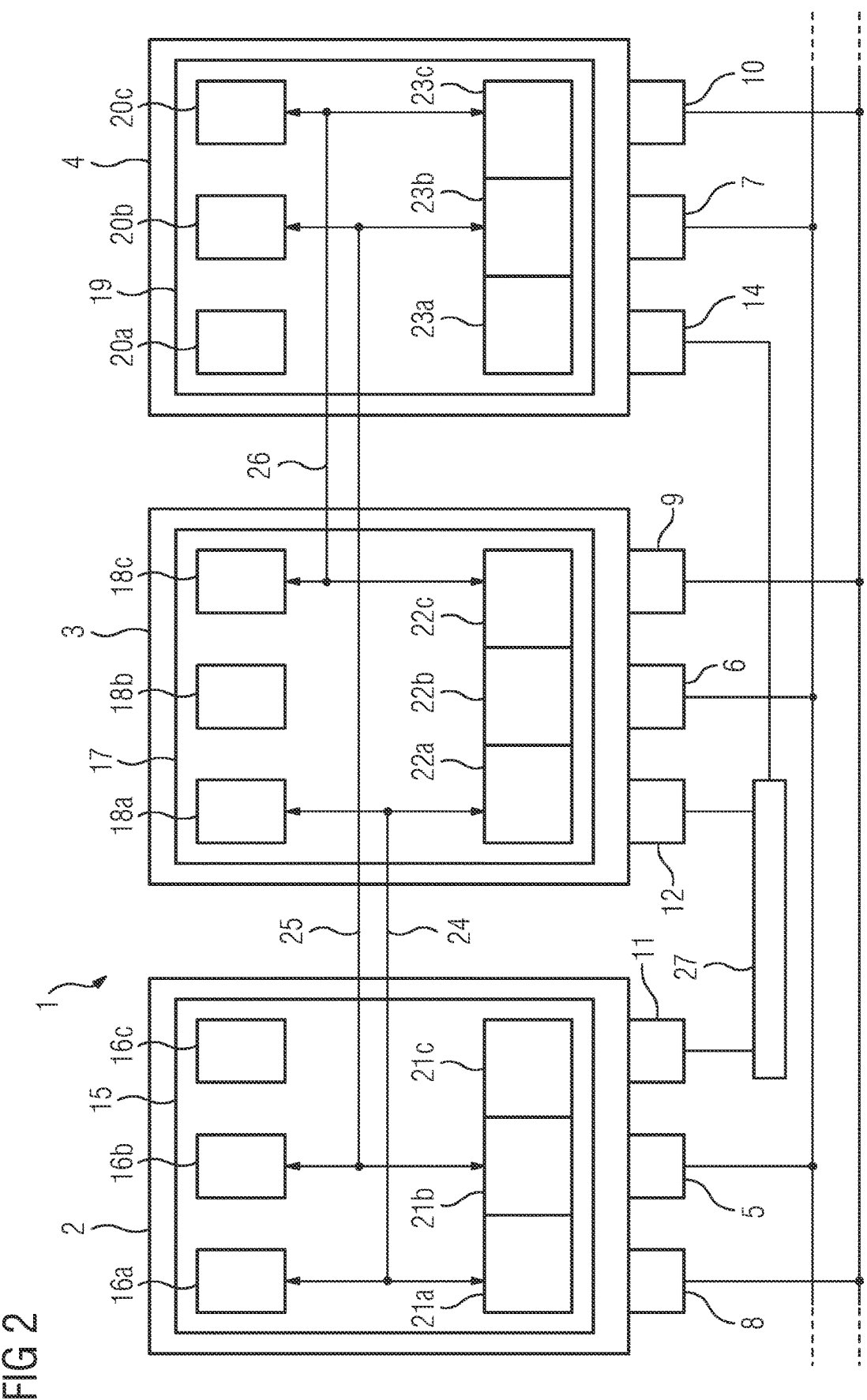
FIG. 2 shows a second redundant automation system.

In general, a subsystem 2, 3, 4 can also have a number of synchronization partners for a specific subprogram 16a, 16b, 16c, 18a, 18b, 18c, 20a, 20b, 20c, and the number is not restricted to two synchronization partners (as shown in FIG. 1 and FIG. 2). A threefold redundancy is significant, for instance, for the case of the planned switch-off of one of the subsystems 2, 3, 4, because to this end an extension from double to triple redundancy is initially performed, before the relevant subsystem 2, 3, 4 is switched off. A singular operation of a subsystem 2, 3, 4 can therefore be connected virtually.

In FIG. 2, the same automation system 1 as in FIG. 1 is essentially shown, as a result of which only the differences are detailed below. The first synchronization interface 11 of the first subsystem 2, the second synchronization interface 12 of the second subsystem 3 and the third synchronization interface 14 of the third subsystem 4 are connected to one another via a multiple, explicit synchronization link. This multiple, explicit synchronization link comprises a network switch 27. The advantage here also lies in subprograms 16a, 16b, 16c, 18a, 18b, 18c, 20a, 20b, 20c, which require a high synchronization clock, being distributed arbitrarily onto the subsystems 2, 3, 4 and being relocated if required.

The multiple, explicit synchronization link is based on an Ethernet protocol (optionally with copper or fiber optic cables as a physical medium). VLAN Virtual Local Area Network) tags are used to identify the individual subsystems 2, 3, 4 within the Ethernet link. These are defined in the Ethernet standard (Institute for Electrical and Electronic Engineers (IEEE) 802.3) as part of the header and are used to operate a number of virtual networks, on a single physical network, which are separated from one another at MAC level. The VLAN tags are currently assigned to the respective synchronization interfaces 11, 12, 14 of the subsystems 2, 3, 4. The network switch 27 evaluates the VLAN tags even before the MAC address of the respective subsystem 2, 3, 4, in order to be able to forward data without a time delay within this virtual network. Complete independence from the hardware is therefore also provided, because the MAC addresses of the subsystems 2, 3, 4 play no role in data transportation.

If a unique number is assigned to each subsystem 2, 3, 4, this can also, when converted into a VLAN tag, be integrated into the synchronization telegram associated with a subprogram 16a, 16b, 16c, 18a, 18b, 18c, 20a, 20b, 20c, so that the subsystem 2, 3, 4 can in turn send a data packet practically blind. The network switch 27 evaluates the VLAN tag and directs the data packet to the correct subsystem 2, 3, 4, which establishes the synchronization partner for this subprogram 16a, 16b, 16c, 18a, 18b, 18c, 20a, 20b, 20c. In the event of an error, the actual hardware can therefore also be exchanged without any problem.

Figure 3:
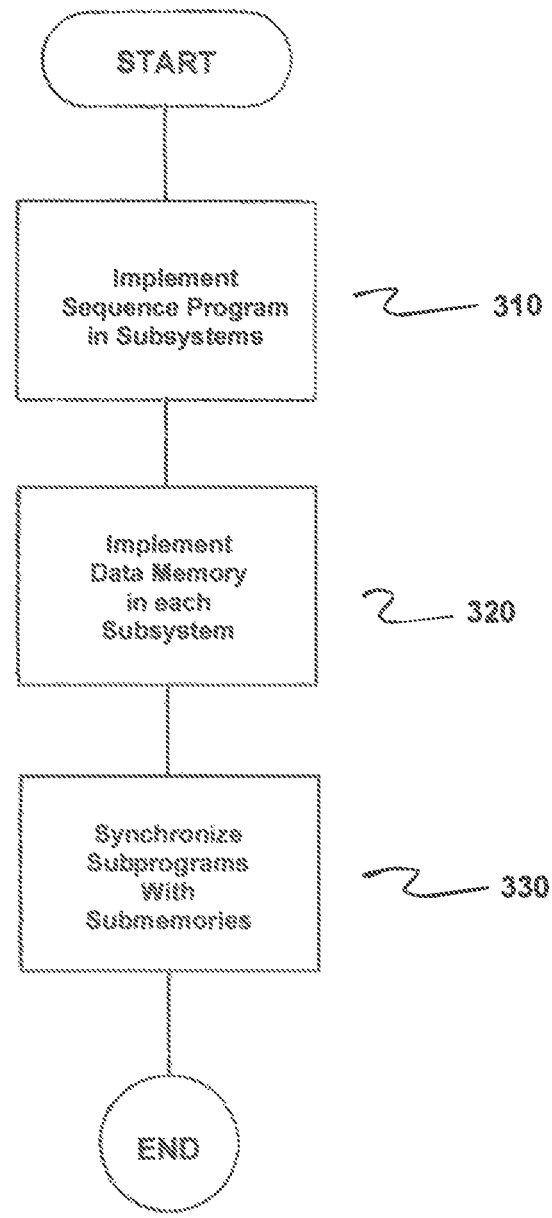
FIG. 3 shows a flowchart of the method in accordance with the invention.

FIG. 3 is a flowchart of the method for operating a redundantly configured automation system 1 having at least one first subsystem 2, 3, 4, at least one second subsystem (2, 3, 4) and at least one third subsystem 2, 3, 4. The method comprises implementing a sequence program in each of the subsystems 2, 3, 4 of the automation system 1, as indicated in step 310. In accordance with the invention, the sequence program is executable in a runtime environment 15, 17, 19 to fulfill automation tasks.

Next, implementing a data memory is implemented in each subsystem 2, 3, 4 of the automation system 1, as indicated in step 320. Here, the sequence program includes at least one first subprogram 16a, 16b, 16c, 18a, 18b, 18c, 20a, 20b, 20c and one second subprogram 16a, 16b, 16c, 18a, 18b, 18c, 20a, 20b, 20c, and the data memory in each subsystem 2, 3, 4 of the automation system 1 each include at least one first submemory 21a, 21b, 21c, 22a, 22b, 22c, 23a, 23b, 23c and one second submemory 21a, 21b, 21c, 22a, 22b, 22c, 23a, 23b, 23c.

Next, the first subprogram 16a, 16b, 16c, 18a, 18b, 18c, 20a, 20b, 20c and the first submemory 21a, 21b, 21c, 22a, 22b, 22c, 23a, 23b, 23c are synchronized with a first synchronization clock between the at least one first subsystem 2, 3, 4 and the at least one second subsystem 2, 3, 4, and the second subprogram 16a, 16b, 16c, 18a, 18b, 18c, 20a, 20b, 20c and the second submemory 21a, 21b, 21c, 22a, 22b, 22c, 23a, 23b, 23c are synchronized with a second synchronization clock between the at least one first subsystem 2, 3, 4 and the at least one third subsystem 2, 3, 4, as indicated in step 330. In accordance with the invention, the first synchronization clock and the second synchronization clock differ from one another.

Thus, while there have been shown, described and pointed out fundamental novel features of the invention as applied to a preferred embodiment thereof, it will be understood that various omissions and substitutions and changes in the form and details of the methods described and the devices illustrated; and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A redundantly configured automation system, comprising:
 a first subsystem;
 a second subsystem; and a third subsystem;
wherein a sequence program is implemented in each subsystem of the automation system, each sequence program being executable in a runtime environment to fulfill automation tasks, and a data memory being implemented in each subsystem of the automation system;
wherein the sequence program includes at least a first subprogram and a second subprogram;
wherein each data memory includes at least one first submemory and a second submemory, the first submemory being assigned to the first subprogram and the second submemory being assigned to the second subprogram;
wherein a synchronization clock of the first subprogram and the first submemory differs from a synchronization clock of the second subprogram and the second submemory;
wherein the automation system is configured to synchronize the first subprogram and the first submemory between the first subsystem and the second subsystem, and to synchronize the second subprogram and the second submemory between the first subsystem and the third subsystem; and
wherein a third subprogram of the first subsystem, the second subprogram of the second subsystem and a first subprogram of the third subsystem are each unsynchronized and are each only processed by a respective runtime environment as respective singular applications.

2. The redundantly configured automation system as claimed in claim 1, wherein a subprogram and a submemory assigned to the subprogram are each contained in a computer-implemented container.

3. The redundantly configured automation system as claimed in claim 1, wherein the first subsystem and the second subsystem are interconnected via an explicit synchronization link and the first subsystem and the second subsystem are interconnected via an implicit synchronization link.

4. The redundantly configured automation system as claimed in claim 2, wherein the first subsystem and the second subsystem are interconnected via an explicit synchronization link and the first subsystem and the second subsystem are interconnected via an implicit synchronization link.

5. The redundantly configured automation system as claimed in claim 1, wherein the first subsystem, the second subsystem and the third subsystem are interconnected via a multiple, explicit synchronization link.

6. The redundantly configured automation system as claimed in claim 5, wherein the multiple, explicit synchronization link comprises at least one network switch and is based on an Ethernet protocol.

7. The redundantly configured automation system as claimed in claim 1, wherein the sequence program additionally includes at least one third subprogram; and
wherein the data memory additionally includes at least one third submemory, the automation system being configured to synchronize the third subprogram and the third submemory between the second subsystem and the third subsystem.

8. The redundantly configured automation system as claimed in claim 1, wherein at least one subsystem of the first, second and third subsystems is cloud-based.

9. The redundantly configured automation system as claimed in claim 1, wherein the first, second and third subsystems are each configured to dynamically determine a respective synchronization partner for synchronizing a subprogram and an associated submemory based on a quality criterion.

10. A method for operating a redundantly configured automation system having at least one first subsystem, at least one second subsystem and at least one third subsystem, the method comprising:
implementing a sequence program in each of the subsystems of the automation system, said sequence program being executable in a runtime environment to fulfill automation tasks;
implementing a data memory in each subsystem of the automation system, the sequence program including at least one first subprogram and one second subprogram, and the data memory in each subsystem of the automation system each including at least one first submemory and one second submemory;
synchronizing the first subprogram and the first submemory with a first synchronization clock between the at least one first subsystem and the at least one second subsystem, and synchronizing the second subprogram and the second submemory with a second synchronization clock between the at least one first subsystem and the at least one third subsystem;
wherein the first synchronization clock and the second synchronization clock differ from one another; and
wherein a third subprogram of the first subsystem, the second subprogram of the second subsystem and a first subprogram of the third subsystem are each unsynchronized and are each only processed by a respective runtime environment as respective singular applications.

11. The method as claimed in claim 10, wherein a subprogram and a submemory assigned to the subprogram are each contained in a computer-implemented container.

12. The method as claimed in claim 10, wherein the at least one first subsystem and the at least one second subsystem are interconnected via an explicit synchronization link and the at least one second subsystem and the at least one third subsystem are interconnected via an implicit synchronization link.

13. The method as claimed in claim 11, wherein the at least one first subsystem and the at least one second subsystem are interconnected via an explicit synchronization link and the at least one second subsystem and the at least one third subsystem are interconnected via an implicit synchronization link.

14. The method as claimed in claim 10, wherein the at least one first subsystem, the at least one second subsystem and the at least one third subsystem are interconnected via a multiple, explicit synchronization link.

15. The method as claimed in claim 11, wherein the at least one first subsystem, the at least one second subsystem and the at least one third subsystem are interconnected via a multiple, explicit synchronization link.

16. The method as claimed in claim 10, wherein the multiple, explicit synchronization link comprises at least one network switch and is based on an Ethernet protocol.

17. The method as claimed in claim 10, wherein the sequence program additionally includes at least one third subprogram; and
wherein the data memory additionally includes at least one third submemory; and wherein the automation system synchronizes the third subprogram and the at least one third submemory between the at least one second subsystem and the at least one third subsystem.

18. The method as claimed in claim 10, wherein the at least one first, second and third subsystems are each configured to dynamically determine a respective synchronization partner for synchronizing a subprogram and an associated submemory based on a quality criterion.

\* \* \* \* \*